United States Patent [19]

Siddall et al.

[11] 4,026,031

[45] May 31, 1977

[54] SURFACE MEASUREMENT INSTRUMENTS

[75] Inventors: Graham John Siddall, Keyworth, England; Michael Antony Player, Aberdeen, Scotland

[73] Assignee: The Rank Organisation Limited, London, England

[22] Filed: Sept. 24, 1975

[21] Appl. No.: 616,130

[30] Foreign Application Priority Data

Sept. 24, 1974 United Kingdom .............. 41561/74

[52] U.S. Cl. .............................. 33/174 L; 33/174 P
[51] Int. Cl.² ........................................... G01B 7/28
[58] Field of Search ......... 33/174 L, 172 E, 174 Q, 33/169 C, 174 P

[56] References Cited

UNITED STATES PATENTS 3,259,989  7/1966  Wilson ............................. 33/174 L Primary Examiner—Richard E. Aegerter
Assistant Examiner—Willis Little
Attorney, Agent, or Firm—Brisebois & Kruger

[57] ABSTRACT

A method of determining the coordinates of the center of curvature of the curved surface of a workpiece on a surface measurement instrument of the type having a workpiece table rotatably mounted on a main spindle, and a sensor for contacting the surface of a workpiece mounted on the table. The method comprises the steps of traversing the sensor over the workpiece surface and deriving three signals representing the value of the radial distance from the spindle to the workpiece surface at three points spaced along the traverse. From these values, and a knowledge of the angular separation of the three points an approximation for the coordinates of the center of the curved surface of the workpiece with respect to the spindle can be derived using the algorithm $$\bar{x} = \frac{r_3 - r_1}{2\sin\phi}$$

and $$\bar{y} = \frac{2r_2 - (r_1 + r_3)}{2(1 - \cos\phi)}$$

where $\bar{x}$ and $\bar{y}$ respectively represent the coordinates of the center of the workpiece, $r_1$, $r_2$, $r_3$ represent the radial distance from the spindle axis to the workpiece surface at the three points along the traverse, and $\phi$ represents the angular separation of the three points.

Using a further algorithm derived from this an estimate of the radius of curvature of the surface can also be provided.

13 Claims, 4 Drawing Figures

THE ALGORITHM

SIMPLE METHOD : NOISY CIRCLE

LEAST SQUARES:-

CENTRE ☐        $\bar{x} = 11$ mm        $\bar{p} = 55$ mm $\bar{y} = 6$ mm

SIMPLE METHOD (SINGLE ITERATION):- $\phi = 120°$

CENTRE △        $\bar{x} = 9$ mm         $\bar{p} = 53$ mm $\bar{y} = 6$ mm

SURFACE MEASUREMENT INSTRUMENTS

The present invention relates to surface measurement instruments and particularly to instruments of the type having a table on which a workpiece is mounted and a sensor which is drawn in contact with the surface of the workpiece to produce output signals representative of surface variations upon relative rotation of the sensor and the table on which the workpiece is mounted. Surface measuring instruments of this type will be referred to hereinafter as "surface measurement instruments of the type described". The relative rotation between the table and the sensor may be effected by maintaining the sensor fixed and rotating the table, or by maintaining the table fixed and moving the sensor about it. There is no fundamental difference, as far as the sensing of the workpiece surface is concerned between either system.

The output signals from the sensor are amplified and displayed to provide a representation of the particular form of the workpiece surface. In order to provide a meaningful display the sensor output signals represent only the variations of the surface itself, and the actual radius of the workpiece is suppressed in obtaining the output signals representative of the surface. For accuracy of the resulting output signals and the display representative thereof it is essential that the centres of the workpiece and the relative rotation between the workpiece and the sensor are substantially coincident.

For workpieces of large diameter, or workpieces having only a partial arc, that is a curve which does not extend through 360°, it is particularly difficult accurately to locate the centre of curvature of the curved surface with the centre of relative rotation of the workpiece and the sensor. This, however, is an essential operation in setting up a surface measurement instrument and when such instruments are used for the testing of component parts on a mass production basis it represents a considerable amount of wasted labour. Surface measurement instruments have, in the past, been fitted with apparatus for automatically determining the eccentricity between the centre of a workpiece and the centre of relative rotation between the workpiece and a sensor, but these have required several complete traverses around a continuous curved surface in order to provide output signals of sufficient accuracy to utilise in making the necessary adjustments to the relative positions of the workpiece and the sensor. Such a system is clearly not usable for workpieces of which the curved surface is only a partial arc. A recent proposal has been made for a method of determining the eccentricity of a workpiece by deriving an output signal from the sensor output in a limacon form, and although this method is accurate it is somewhat involved and expensive.

The present invention seeks to provide a method for determining the eccentricity of the centre of curvature of the curved surface of a workpiece which provides a suitable approximation for the initial centring of a workpiece.

According to the present invention a method of determining the coordinates of the centre of curvature of the curved surface of a workpiece with respect to a predetermined frame of reference the origin of which coincides with the centre of relative rotation between the workpiece and a sensor of a surface measurement instrument of the type described, comprises the steps of traversing the sensor over the workpiece surface and deriving from the sensor output three signals representing the value of the radial distance of the surface of the workpiece from the centre of relative rotation at three points along the traverse of the sensor, the middle point lying at the intersection of one of the axes of the predetermined frame of reference and the workpiece surface, and the other two points subtending an angle $\phi$ with the middle point at the centre of relative rotation, and deriving from these values two output signals representing the expressions $$\bar{x} = \frac{r_3 - r_1}{2\sin\phi}$$

and $$\bar{y} = \frac{2r_2 - (r_1 + r_3)}{2(1 - \cos\phi)}$$

where $\bar{x}$ and $\bar{y}$ respectively represent the coordinates of the centre of the workpiece parallel to and perpendicular to the said one axis and $r_1, r_2, r_3$ represents the radial distances determined at the three points in order along the traverse.

The angle $\phi$ subtended between adjacent points at which the radial distance of the surface of the workpiece is to be determined should be determined in advance before effecting the traverse. For workpieces having only a limited arc available for the traverse the angle $\phi$ will be limited by this arc. Preferably this angle is made as large as possible in order to improve the accuracy of the method. For example, if a cylindrical workpiece is to be set up on the surface measuring instrument it is preferable for the angle $\phi$ to be 120° so that the three points on the surface are equi-angularly spaced about the surface. If the points are closely spaced then clearly a certain amount of information about the nature of the surface is lost by virtue of the fact that the traverse of the stylus between the first and the last of these points will not incorporate the whole of the surface and thus will effectively ignore the information which could be derived by a traverse over the whole of the surface.

For a surface having a degree of surface roughness it is not appropriate to take the instantaneous value of the sensor output at the particular point in question since this will be modified by the surface roughness and would therefore produce an inaccurate result. In order to overcome this it is preferred that the signals representing the value of the radial distance of the surface of the workpiece at the three points along the traverse of the sensor are obtained by deriving an average value of the sensor output signal over a part of the traverse extending to each side of each of the three points. In a practical instrument it is convenient if the signals representing the value of the radial distance of the surface of the workpiece at each of the three points along the traverse of the sensor are obtained by integrating the sensor signal over a range extending equally to either side of each point.

For maximum accuracy the ranges about adjacent points, over which the values of the radial distances are determined should be contiguous, but should not overlap.

The method may further include the step of displaying the value of the two output signals to represent the coordinates of the centre of the workpiece in two perpendicular directions from an origin coincident with the centre of relative rotation of the sensor and the workpiece.

The present invention also comprehends a method of centring a workpiece on the centre of relative rotation between the workpiece and a sensor of a surface measurement instrument of the type described comprising the steps of providing a display representing the coordinates of the centre of curvature of the curved surface of a workpiece in two mutually perpendicular directions with respect to the centre of relative rotation between the workpiece and the sensor by the method of the invention defined above, and manually adjusting the position of the workpiece in the said two mutually perpendicular directions with respect to the position of the centre of relative rotation between the workpiece and the sensor in accordance with the displayed values of the coordinates. Since the method only provides an approximation to the correct eccentricity of the centre of the workpiece it is convenient, if greater accuracy is required, to perform an iterative process repeating the traverse after having made a first adjustment in order to provide further signals representing the new eccentricity of the workpiece with respect to the centre of relative rotation, and making further adjustments in accordance with the new eccentricity. The process may be repeated any number of times in dependence on the required accuracy.

The method of the invention is particularly suitable for use with manual adjustment of the position of the workpiece although automatic apparatus operating on the signals representing the $x$ and $y$ coordinates of the centre of the workpiece could be provided if desired. For accurate centring the method is repeated, it being found that two or three iterations will provide sufficient accuracy. With such smoothing it has been found that the results of performing the method of this invention are comparable to, if not better than results produced by other techniques, such as the limacon form calculation described in our patent application No. 24748/73.

The present invention also comprehends apparatus for performing the method defined above with a surface measurement instrument of the type described, including means sensitive to the relative angular orientation of the workpiece and the sensor, two integrating circuits, a proportioning circuit to which is fed the sensor output signal and the output signal from which represents a proportion of the sensor output signal and is fed to the integrators under the control of means for controlling the integrators in dependence on the relative angular orientation of the workpiece and the sensor, to accumulate signals representative of the average value of the radial distance of the surface of the workpiece from the centre of relative rotation over respective ranges on either side of each of the three said points.

It is also possible to extend the method of this invention to the determination of the radius of a component without requiring to centre the component accurately on the centre of relative rotation by calculating the value of the coordinates of the centre of the workpiece and then using one of these (that representing the displacement of the centre in the direction of the said one axis coincident with the middle point of the said three points at which the radial separation of the surface from the centre of relative rotation is determined, in this case the $y$ axis) in the expression:

$$R = M\,[(r_2 - L) - \bar{y}] -$$

Where R is the radial error, that is the difference between the true radius $\rho$ and the "suppressed" radius L which is due to the limited range of the sensor of the instrument, and M is the instrument magnification.

One embodiment of the present invention will now be more particularly described, by way of example, with reference to the accompanying drawings, in which.

Figure 1:
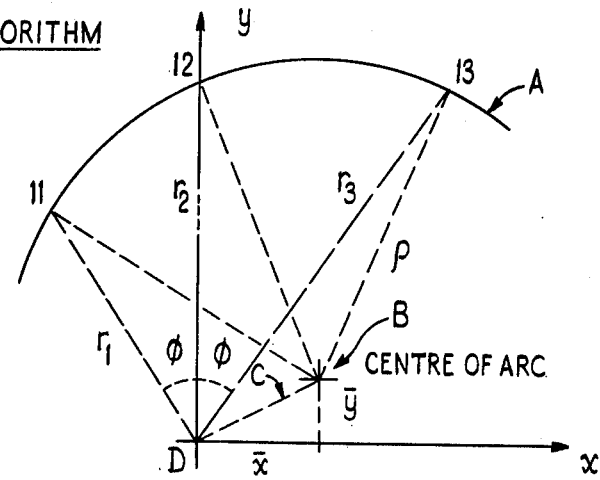
FIG. 1 is a diagram illustrating the derivation of the algorithm on which the present invention is based.

Referring now to FIG. 1 the curve A represents a curved surface of a workpiece having a centre B which is displaced by the values $\bar{x}$ and $\bar{y}$ in the $x$ and $y$ directions from the origin D of a pair of mutually perpendicular cartesian coordinate axes. The origin D of the cartesian axes represents the centre of relative rotation between the body A and a sensor of a surface measurement instrument of the type described. For the performance of the method it is only necessary to determine the radial separation of the surface A from the origin D at three points 11, 12, 13 spaced along a line, representing the line of traverse of the sensor, on the surface A. The middle point 12 lies at the intersection of the $y$ axis with the surface A and adjacent points 11, 12 and 12, 13 subtend the same angle, $\phi$, at the origin D. The radial distances of the points 11, 12 and 13 are $r_1$, $r_2$ and $r_3$ respectively, and the true radius of the curved surface A is $\rho$. With respect to the cartesian axes shown the equation of the arc may be written as $$r(r - 2\bar{x}\cos\theta - 2\bar{y}\sin\theta) = \rho^2 - c^2$$

From this expression, substituting the values of $r$ and $\theta$ at the three points 11, 12, 13 it can be shown that:

$$\bar{x} = \frac{r_3 - r_1}{2\sin\phi}\left(\frac{\rho^2 - c^2 + r_1 r_3}{2 r_1 r_3}\right)$$

$$\bar{y} = \frac{(r_1 + r_3)(r_1 r_3 - r_2^2)}{2(2 r_1 r_3 \cos\phi - r_2(r_1 + r_3))}$$

Where C is the distance between the centre B of the arc and the origin D.

In these expressions $r_1$, $r_2$ and $r_3$ represent the actual distances of the surface from the centre of relative rotation at the origin D. The signals from a surface measuring instrument of the type described, however, would not represent the true value of the radial separation of the surface from the origin D at any one point due to the radius suppression, but, in fact, would represent the departure of the surface at any one point from a nominal reference line determined by the separation between the centre of relative rotation of the workpiece and the sensor, and the mounting point of the sensor itself.

It can be shown that where the values $r_1$, $r_2$ and $r_3$ are the amplified signals from a sensor representing the deviation from a nominal centre line as mentioned above, the coordinates of the centre of a workpiece are given by $$\bar{x} = \frac{r_3 - r_1}{2 \sin \phi} (1 + O(c/\rho))$$

and $$\bar{y} = \frac{2r_2 - (r_1 + r_3)}{2(1 - \cos \phi)} (1 + O(c/\rho))$$

Where $O(c/\rho)$ is an expression of the order of $c/\rho$ which can be neglected, particularly since the method usually involves an iterative process and $c/\rho$, which is always very much less than 1, becomes smaller with each iteration.

As mentioned above, the instantaneous value of the sensor signal at the points 11, 12 and 13 will be modified by the surface roughness of a workpiece and in order to obtain more accurate values it is preferred to determine an average value of the sensor signal over a range about either side of the points 11, 12 and 13. The values $r_1$, $r_2$ and $r_3$ can thus be provided by integrating the sensor signal over a part of the traverse to either side of each of the points 11, 12 and 13.

Figure 2:
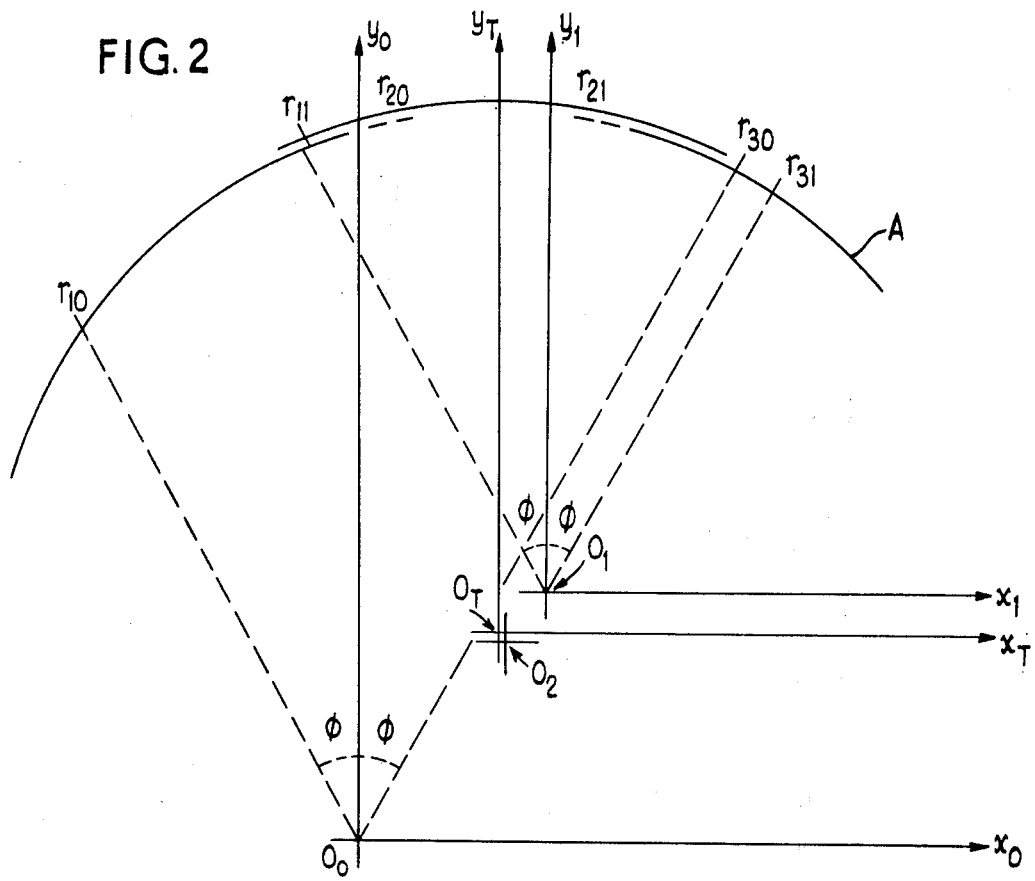
FIG. 2 is a diagram illustrating a first example of a text made using the method of the invention.

The example shown in FIG. 2 illustrates the performance of the method on a workpiece A having a radius of 83 millimeters. The workpiece was first set up with its centre at the point $O_0$ which was displaced as shown in the drawing from the origin $O_t$, which is the centre of relative rotation of the workpiece A and the sensor of the surface measuring instrument. After a first traverse the signals representing the $x$ and $y$ coordinates of the centre provided values of $-23$ millimeters and $-32$ millimeters for the $x$ and $y$ coordinates respectively. Adjustment to the position of the workpiece A in the $x$ and $y$ directions by these amounts brought the centre to the point $O_1$ and upon a subsequent traverse the values for the $x$ and $y$ coordinates of the centre with respect to the origin $O_t$ were given as $+8$ millimeters and $+7$ millimeters in the $x$ and $y$ direction respectively. The workpiece was thus moved by these values and this took the centre to the point $O_2$. A third traverse of the sensor was then made and the output reading gave the $x$ and $y$ coordinates of the centre as $+1$ millimeter and $-1$ millimeter respectively. It can be seen, therefore, that by using an iterative process an improvement in the accuracy of the centring can be obtained to within quite reasonable limits. Even with a traverse over a relatively limited extent (in this example $\phi$ was 30° so that the whole traverse extended over only approximately 90°; the full traverse being $3\phi$).

Figure 3:
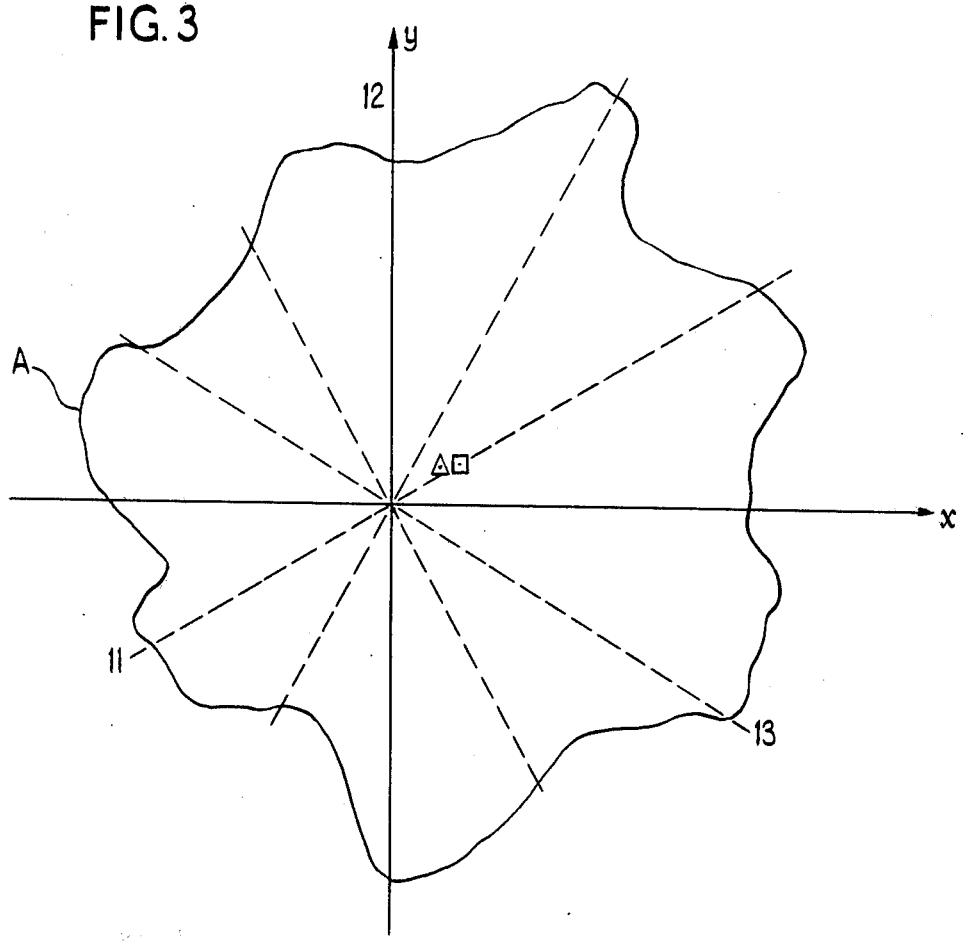
FIG. 3 is a diagram illustrating a second example of a test made using the method of the invention.

In FIG. 3 there is shown a diagram illustrating the use of the method on a workpiece having a continuous closed rough surface. In this example the three points at which the radial separation of the surface from the centre of relative rotation was determined were spaced by 120° apart. The true centre of the workpiece was positioned at $x$ and $y$ coordinates of 11 millimeters and 6 millimeters respectively and following a further complete traverse around the surface the $x$ and $y$ coordinates of the centre were determined, using the method of the invention, as 9 millimeters and 6 millimeters respectively.

The principles of the present invention can also be extended to the determination of the radius of a circular component, or to the radius of curvature of the curved surface of a part circular component. Referring back to FIG. 1, it can be shown that the radius $\rho$ of a component is given by $$\rho = r_2 - \bar{y} + O\left(\frac{c^2}{\rho}\right)$$

The instrument output signal, however, does not represent the actual value of the separation of the workpiece surface from the centre of relative rotation but the value of this separation less the well known "suppressed radius" which arises due to the limited range of the sensor of the instrument. The radius (R) derived from the instrument signal would thus be related to the true radius $\rho$ by the expression $$R = M(\rho - L)$$

where $L$ is the suppressed radius and $M$ the magnification. From this and the preceding expression, and making suitable approximations, it can be shown that:

$$R = M[(r_2 - L) - \bar{y}]$$

In this expression the term $M(r_2 - L)$ is the pick-up output at point 12.

Now if $\overline{R}$ is used to denote $\rho - L$, $\overline{R}$ may be considered as the radial error and $M\overline{R}$ as the magnified radial error.

For a circular part with the three points equiangularly spaced about the circumference ($\phi = 120°$) the expression for $\overline{R}$ is consistent with that defined in BS 3730:1964.

An indication of the convergence properties of the approximations is given by the results shown in the following Table. These are a few of the results obtained using a computer simulation of a noise-free arc of radius $R = 1,000$ with an initial centre $\bar{x}_0$, $\bar{y}_0$ deliberately offset with respect to the arc centre. By computing $r_1$, $r_2$ and $r_3$ for a given $\phi$, estimates of $\rho_i - L$ and of $\bar{x}_i$, $\bar{y}_i$ are obtained. The convergence is rapid, which is particularly notable since the initial eccentricities shown are much greater than would usually be encountered when setting up components on stylus instruments in a practical situation. In general, two iterations at most should be sufficient to position a badly centred part within the effective range of the pick-up. For eccentricities ($c/\rho$) of less than $5 \times 10^{-3}$, the estimate of $\rho$ is generally within 1 part in $10^5$ of the correct value. Since a maximum eccentricity of the order of $10^{-3}$ is typical for a stylus instrument, this means that accurate estimates of the radial term can be made, subject to certain linearity constraints, on badly centred components.

| Arc length $(3\phi)$ | Iteration No. $i$ | $\bar{x}_i$ | $\bar{y}_i$ | $R_i$ |
| --- | --- | --- | --- | --- |
| 15° | 0 | 50 | 50 | 998.7283 |
|  | 1 | 2.4944 | 0.0206 | 1000.0081 |
| 30° | 0 | 50 | 50 | 998.7432 |
|  | 1 | 2.4648 | 0.0057 | 1000.0068 |
| 60° | 0 | 100 | 100 | 994.9006 |
|  | 1 | 9.4444 | 0.0865 | 1000.0427 |
|  | 2 | 0.0006 | −0.0876 | 1000.0020 |
|  | 3 | −0.0001 | −0.0026 | 1000.0002 |
| 90° | 0 | −50 | 50 | 998.7437 |
|  | 1 | −2.1679 | 0.0054 | 1000.0002 |
| 180° | 0 | 100 | 100 | 994.9680 |
|  | 1 | 5.0254 | 0.0191 | 1000.0061 |
| 270° | 0 | 100 | 100 | 994.9871 |
|  | 1 | 0.0001 | 0.0000 | 999.9998 |
| 360° | 0 | 100 | 100 | 994.9820 |

-continued

| Arc length (3φ) | Iteration No. i | $\bar{x}_i$ | $\bar{y}_i$ | $R_i$ |
|---|---|---|---|---|
| | 1 | −5.0252 | 0.0063 | 999.9934 |
| | 2 | 0.0001 | −0.0062 | 999.9998 |

Figure 4:
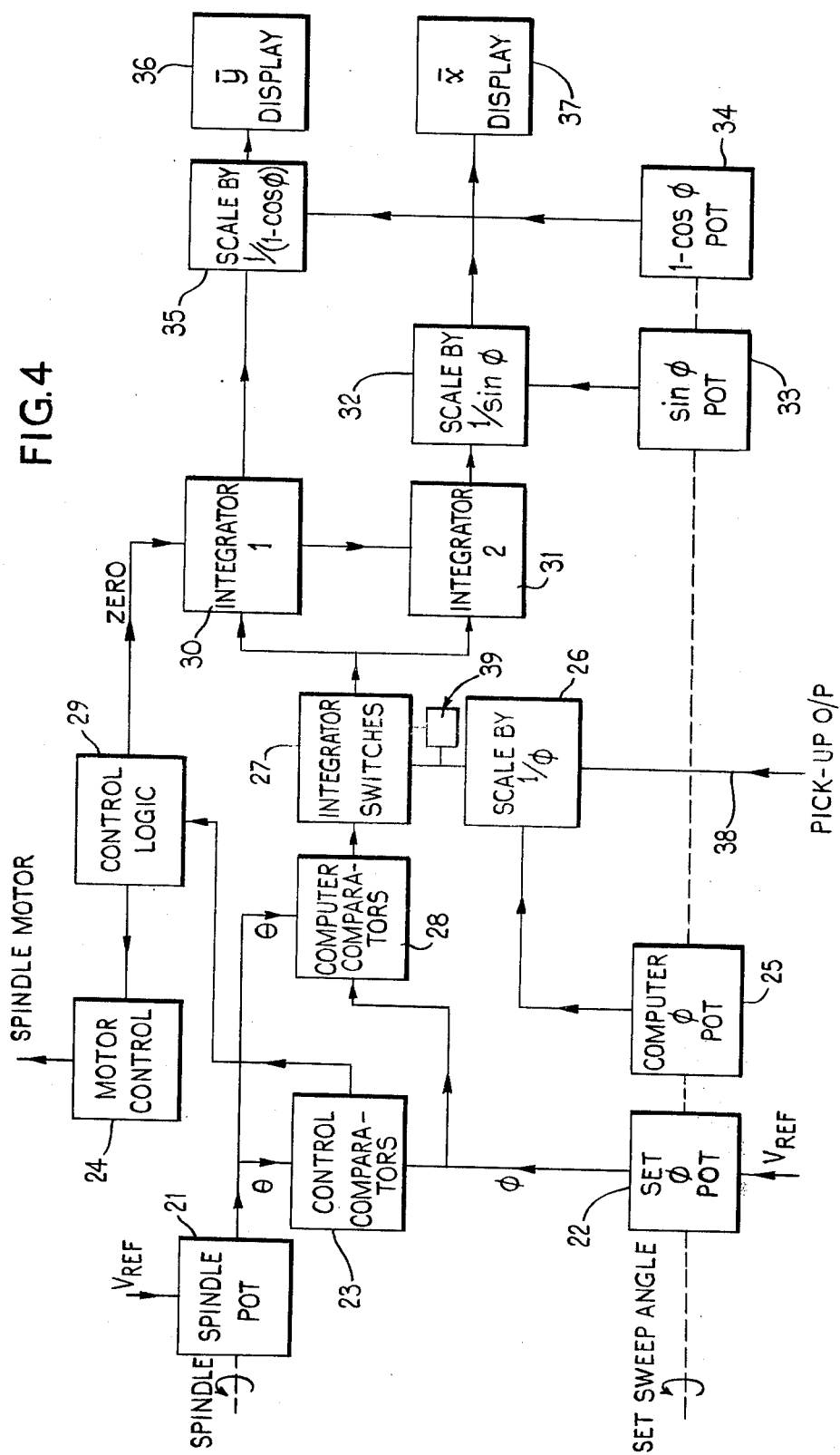
FIG. 4 is a block schematic diagram illustrating an analogue circuit for performing the method of the invention.

FIG. 4 illustrates the apparatus used in obtaining the examples of FIGS. 2 and 3. The apparatus illustrated in FIG. 4 is that required in addition to the conventional surface measurement instrument of the type described which is sufficiently well known to require no further description. A potentiometer 21 is connected between the table on which the workpiece is mounted and the mounting of the sensor so as to provide, from an input signal Vref, an output representative of the instantaneous angle $\theta$ of the workpiece with respect to the sensor related to a given frame of reference. A further potentiometer 22, also fed with the reference signal Vref is provided; this second potentiometer is not connected to the apparatus, however, but serves to provide an output reference signal indicating the selected value of the angle $\phi$ separating the adjacent points at which the values of the radial separation of the surface of the workpiece and the centre of relative rotation are to be determined. The outputs from the first potentiometer 21 and the second potentiometer 22 are both fed to control comparators 23 which provide output signals when the value of the variable angle $\theta$ coincides with suitable proportions of the fixed reference angle $\phi$ on either side of the y axis of the fixed frame of reference, or the position midway between these points, and provides an output signal to a control logic circuit 29 which feeds a motor control circuit 24 to start and stop a motor (not shown) controlling the traverse of the stylus of the machine: the motor control circuit 24 is a servo amplifier controlling a D.C. motor with tachogenerator feedback. This control circuit ensures that the motor, and hence the spindle, rotates at a constant speed which can be altered simply by changing a reference voltage.

The control logic circuit 29 is provided with position data inputs from the control comparators and with manual control inputs operable to set the spindle position to $+\phi$; 0 or $-\phi$; there are also manual controls for sweep start and halt, and single or continuous sweep mode. The control logic 29 provides three outputs to the motor control circuit 24 to drive the motor at full speed forward, full speed reverse, or sweep speed forward.

The output signals from the potentiometers 21 and 22 are also fed to a comparator and logic circuit 28 the output of which controls an integrator switching and scaling circuit 27. The output from the sensor of the surface measuring instrument (not shown) is fed on a line 38 to a scaling circuit 26 which is also fed with an output signal from a potentiometer 25 mechanically linked to the second potentiometer 22 and providing an output signal representative of the angle $\phi$. The scaling circuit 26 thus modifies the sensor output and has one output which passes to the switch circuit 27 a signal representing the sensor output scaled by a factor of $1/\phi$, and another output which passes the same signal to an inverter 39 which then feeds the integrator switches 27. The reason for this scaling is that since, in practice, the workpiece which is traversed by the sensor will have a degree of surface roughness, it is necessary to determine the signals representative of $r_1$, $r_2$ and $r_3$ as averages over a range to either side of the points 11, 12 and 13 of FIG. 1. This is achieved by feeding the scaled signals to a first integrator 30 or to a second integrator 31 in dependence on the control of the switching circuit 27 effected by the comparator 28. The maximum range over which the integration can be effected without the ranges overlapping, if adjacent points at which $r_1$, $r_2$ and $r_3$ are to be determined subtend an angle $\phi$ at the centre of relative rotation, is from an angular position spaced $\phi/2$ on either side of each point. With an obvious notation for the angular limits the values of $r_1$, $r_2$ and $r_3$ produced by the integrators 30 and 31 are thus as follows:

$$r_1 = \frac{1}{\phi} \int_{-3\phi/2}^{-\phi/2} r d\theta$$

$$r_2 = \frac{1}{\phi} \int_{-\phi/2}^{\phi/2} r d\theta$$

$$r_3 = \frac{1}{\phi} \int_{\phi/2}^{3\phi/2} r d\theta$$

The limits to the integrals are determined by the comparators 28 which are fed with signals from the potentiometer 22 representing the set value of the angle $\phi$ and with signals from the potentiometer 21 representing the instantaneous value of the angle $\theta$.

Since the circuit operates to integrate the data signal from the pick-up output it is important that the motor driving the workpiece table is controlled to run at an accurately constant speed and to start and stop at accurately determined positions, since any change in the speed during a traverse would lead to errors in the integration.

Positional control of the spindle on which the workpiece table is mounted is achieved by on-off switching of the motor speed control command voltage, rather than by a servo system. The control comparators 23 compare the voltage analog of shaft position ($\theta$) with the voltage analogs of the spindle sweep limits $(+(3/2)\phi, -(3/2)\phi)$ and of the sweep centre provided by the potentiometer 22. They provide suitable logical outputs to the control logic 29 which operates the motor speed command switches of the motor control circuit 24. Also provided are limit comparators (not shown) which supply overriding halt commands to the motor control should $\phi$ exceed maximum allowable values.

The comparator switching levels are also offset by a voltage proportional to motor speed; this partially compensates for overshoot in spindle position due to the finite time required for the spindle to come to rest.

The integrators are also controlled by the logic circuit 29 which, together with the computer comparators 28 switch the integrators to the appropriate scaled values of the input signal ($r$) such that the first integrator 30 accumulates the value $(2r_2-(r_1 + r_3))$ during a traverse of the sensor, and the integrator 31 accumulates the value $(r_3-r_1)$ during this traverse.

The output from the integrator 30 is fed to a scaling circuit 35 which is also fed from a potentiometer 34 mechanically linked to the second potentiometer 22 so as to provide an output signal representative of $(1-\cos\phi)$. The output signal from the scaling circuit represents $$\frac{2r_2 - (r_1 + r_3)}{2(1 - \cos \phi)}$$

This signal is fed to a display device 36 to provide a display of the y coordinate of the eccentricity $\bar{y}$. The output from the second integrator 31 is fed to a scaling circuit 32 which is also fed from a potentiometer 33 mechanically linked to the second potentiometer 22 and providing an output representative of sin $\phi$. The output signal from the scaling circuit 32 represents the expression $$\frac{r_3 - r_1}{2 \sin \phi}$$

and this output signal is fed to a display device 37 which provides the display representative of the x coordinate of the eccentricity, $\bar{x}$.

We claim:

1. A method of determining the coordinates of the centre of curvature of the curved surface of a workpiece with respect to a predetermined frame of reference the origin of which coincides with the centre of relative rotation between the workpiece and a sensor of a surface measurement instrument of the type having a table on which a workpiece is mounted and a sensor which is drawn in contact with the surface of the workpiece to produce output signals representative of surface variations upon relative rotation of the sensor and the table on which the workpiece is mounted, comprising the steps of:

traversing the sensor over the workpiece surface to provide an output signal representing said surface, electrically deriving from said sensor output signal three signals representing the value of the radial distance of said surface of said workpiece from said centre of relative rotation at three points along the traverse of said sensor, the middle point lying at the intersection of one of the axes of said predetermined frame of reference and the workpiece surface, and the other two points subtending at the centre of relative rotation an angle $\phi$ with the middle point, and electrically deriving from said three signals two output signals representing the expressions $$\bar{x} = \frac{r_3 - r_1}{2 \sin \phi}$$

and $$\bar{y} = \frac{2r_2 - (r_1 + r_3)}{2(1 - \cos \phi)}$$

where $\bar{x}$ and $\bar{y}$ respectively represent the coordinates of the centre of the workpiece parallel to and perpendicular to said one axis and $r_1$, $r_2$, $r_3$ respectively represent the radial distance determined at said three points in order along said traverse.

2. The method of claim 1 wherein said three signals representing the value of said radial distance of the surface of said workpiece at said three points along said traverse of said sensor are obtained by electrically averaging the value of said sensor output signal over a part of said traverse extending to each side of each of said three points.

3. The method of claim 2, wherein said signals representing the value of said radial distance of the surface of said workpiece at each of said three points along said traverse of said sensor are obtained by electrically integrating said output signal from said sensor over a range extending equally to either side of each said point.

4. A method of centering a workpiece on the centre of relative rotation between the workpiece and a sensor of a surface measurement instrument of the type having a table on which a workpiece is mounted and a sensor which is drawn in contact with the surface of the workpiece to produce output signals representative of surface variations upon relative rotation of the sensor and the table on which the workpiece is mounted, comprising the steps of:

providing a display of two signals respectively representing the coordinates of the centre of curvature of the curved surface of a workpiece in two mutually perpendicular directions with respect to the centre of relative rotation between the workpiece and the sensor by the method of claim 1, and adjusting the position of the workpiece in said two mutually perpendicular directions with respect to the position of the centre of relative rotation between said workpiece and said sensor in accordance with the displayed values of said signals representing said coordinates.

5. The method of claim 4, further comprising the steps of:

performing a further traverse of the sensor when said adjustment has been made to provide, by the method of claim 1, a further display of said signals representing said coordinates of the centre of curvature of the curved surface of said workpiece in said two mutually perpendicular directions, and readjusting the position of said workpiece in said two mutually perpendicular directions in dependence on the value of the coordinates displayed.

6. A method of centering a workpiece on the centre of relative rotation between the workpiece and a sensor of a surface measurement instrument of the type having a table on which a workpiece is mounted and a sensor which is drawn in contact with the surface of the workpiece to product output signals representative of surface variations upon relative rotation of the sensor and the table on which the workpiece is mounted, comprising the steps of:

providing two signals representing the coordinates of the centre of said workpiece in two mutually perpendicular directions with respect to the centre of relative rotation by the method of claim 1, and applying said two coordinate signals to an automatic position control apparatus operative to adjust the position of said workpiece in said two mutually perpendicular directions in dependence on the value of said two signals.

7. A method of determining the radius of curvature of the curved surface of a circular or part circular component with an instrument of the type having a table on which a workpiece is mounted and a sensor which is drawn in contact with the surface of the workpiece to produce output signals representative of surface variations upon relative rotation of the sensor and the table on which the workpiece is mounted, comprising the steps of traversing said sensor over the surface of the component and deriving from said sensor signals, by the method of claim 1, output signals representing $\bar{x}$ and $\bar{y}$, and then further deriving the value of the radial error R from the expression:

$$R = M(r_2 - L) - \bar{y}$$

where:

M is the magnification of the instrument,
L is the suppressed radius, and
$r_2$ is the value of the radial separation of the surface of the component at the middle point which is coincident with the y axis of said predetermined frame of reference.

8. Apparatus for determining the coordinates of the centre of curvature of the curved surface of a workpiece with respect to a predetermined frame of reference the origin of which coincides with the centre of relative rotation between the workpiece and a sensor of a surface measurement instrument of the type having a table on which a workpiece is mounted and a sensor which is drawn in contact with the surface of the workpiece to produce output signals representative of surface variations upon relative rotation of the sensor and the table on which the workpiece is mounted, said apparatus comprising:
means for traversing the sensor over the workpiece surface whereby to provide an output signal representing said surface,
means for deriving from said sensor output signal three signals representing the value of the radial distance of said surface of said workpiece from said centre of relative rotation at three points along the traverse of said sensor, the middle point lying at the intersection of one of the axes of said predetermined frame of reference and the workpiece surface, and the other two points subtending at the centre of relative rotation an angle $\phi$ with the middle point, and
means for deriving from said three signals two output signals representing the expressions $$\bar{x} = \frac{r_3 - r_1}{2\sin\phi}$$

and $$\bar{y} = \frac{2r_2 - (r_1 + r_3)}{2(1 - \cos\phi)}$$

where $\bar{x}$ and $\bar{y}$ respectively represent the coordinates of the centre of the workpiece parallel to and perpendicular to said one axis and $r_1$, $r_2$, $r_3$ respectively represent the radial distance determined at said three points in order along said traverse.

9. The apparatus of claim 8, wherein said:
means for deriving from said sensor output signals three signals representing the value of the radial distance of the surface of said workpiece from said centre of relative rotation at three points along the traverse of said sensor, comprises:
means sensitive to the relative angular orientation of said workpiece and said sensor,
means determining the angle $\phi$ which is subtended at said centre of relative rotation by adjacent points at which the radial distance of said surface from said centre of relative rotation is determined,
two integrating circuits,
means feeding each said integrator circuit with a signal representing a set proportion of said sensor output signal, and
control means sensitive to the relative angular orientation of said workpiece and said sensor, said control means controlling said integrators in dependence on said relative angular orientation of said workpiece and said sensor to accumulate signals representative of the average value of the radial distance of the surface of said workpiece from said centre of relative rotation of said workpiece and said sensor over respective ranges on either side of each of said three points.

10. The apparatus of claim 9, wherein said control means for controlling said integrators includes:
a switching circuit,
a comparator connected to the output of said means sensitive to the relative angular orientation of said workpiece and said sensor and said means for determining the angle $\phi$, and
a control logic circuit which controls said integrators to accumulate the values $(r_3 - r_1)$ and $(2r_2 - (r_1 + r_3))$, where $r_1$, $r_2$ and $r_3$ are the values of the radial separation of said surface from said centre of relative rotation at said three points.

11. The apparatus of claim 10 wherein said means sensitive to the relative angular orientation of said workpiece and said sensor comprise a potentiometer having two relatively movable parts one attached for movement with the workpiece and the other for movement with the sensor, a further, independently adjustable, potentiometer being provided to produce an output signal representative of the angle $\phi$.

12. The apparatus of claim 11, wherein there are provided two additional potentiometers mechanically associated with said further potentiometer and operating to provide output signals representative of the values $\sin\phi$ and $(1 - \cos\phi)$ respectively.

13. The apparatus of claim 12 wherein there are provided two scaling circuits respectively fed with the output signals from one of the said additional potentiometers and with the output signals from one of said two integrating circuits and operative to scale the output signal of the associated integrator by the reciprocal of the output signal from the associated potentiometer, the output signal from said two scaling circuits thereby respectively representing the $\bar{x}$ and $\bar{y}$ coordinate signals.

* * * * *